United States Patent [19]

Shin-Chung

[11] Patent Number: 4,896,050

[45] Date of Patent: Jan. 23, 1990

[54] REMOTE CONTROL TYPE OF AUTOMATIC CONTROL DEVICE FOR THE AUTOMOBILE DOOR

[76] Inventor: Chen Shin-Chung, No. 11-11 Nei Tso Tsun, Luchu-Taoyuan, Taiwan

[21] Appl. No.: 220,306

[22] Filed: Jul. 18, 1988

[51] Int. Cl.[4] .............................................. H02J 3/14

[52] U.S. Cl. .................................. 307/10.2; 307/10.1; 340/825.69; 180/281

[58] Field of Search ..................... 307/9, 10 R, 10 AT, 307/117; 70/264, 276, 277, 278, 279; 340/64, 63, 825.34, 825.31, 825.72, 825.69, 825.54, 52 D, 52 F, 542, 543, 539; 180/280, 281, 282, 286, 287, 268, 273, 289, 271; 361/172; 318/16, 280, 286

[56] References Cited

U.S. PATENT DOCUMENTS

| | | | |
|---|---|---|---|
| 3,695,381 | 10/1972 | Okada et al. | 180/281 |
| 3,722,615 | 3/1973 | Okada et al. | 180/281 |
| 3,765,502 | 10/1973 | Mark | 180/281 |
| 4,446,380 | 5/1984 | Moriya et al. | 307/10 AT |
| 4,491,917 | 1/1985 | Higgins et al. | 180/286 X |
| 4,667,195 | 5/1987 | Kodera et al. | 180/281 X |
| 4,672,375 | 6/1987 | Mochida et al. | 307/10 AT |
| 4,763,121 | 8/1988 | Tomoda et al. | 340/825.69 |
| 4,679,508 | 7/1987 | Fruehan et al. | 180/281 X |

*Primary Examiner*—William M. Shoop, Jr.
*Assistant Examiner*—Paul Ip
*Attorney, Agent, or Firm*—Esso International Patent and Trademark Office

[57] ABSTRACT

A remote control type of automatic control device for automobile door wherein of the car doors and its locking device is provided with a micro-switch for sensing the state of the car door and the state of the locking device. The locking devices are controlled by locking coils. The locking devices of all the car doors can be locked when a car-speed detecting circuit, a switch circuit and a delay circuit all have a specific output. When the car is parked, an unlocking trigger circuit can unlock all the locking devices. There is a receiving circuit to receive a signal sent by a remote control device. As soon as a signal is received, a trigger will be triggered. The output terminal of the trigger is connected with two NAND gates. One of the input terminals of each two NAND gates is connected one of the two contact points of a micro-switch on the main car door. The output signals of the two NAND gates are used for driving two negatively triggered mono-stable circuits each with a different operation time; an remote control device can send out a signal to the receiving circuit so as to automatically control the operation of the locking devices of the car doors. Since the operation time of the two negatively triggered mono-stable circuits is different, they can drive a indicating lamp which will have different blinking times to indicate the operation state of the locking devices.

10 Claims, 5 Drawing Sheets

REMOTE CONTROL TYPE OF AUTOMATIC CONTROL DEVICE FOR THE AUTOMOBILE DOOR

BACKGROUND OF THE INVENTION

Generally, when a car door is closed the latch of the door will be engaged with the car body. In order to prevent the door from being opened unintentionally, each car door is installed with a locking device beside the door window. The door can be locked by simply pushing the locking device downwards, this prevents the door from being opened during the time when the car is running, even if the door latch is touched unintentionally. This locking device can insure the driving safety of a car, but its main drawback is that it has to be operated manually (i.e., to push it downwards), thus, it is deemed inconvenient to the driver; especially when the car is running. The car door could be opened and could cause danger to the rider or other cars, if the locking device is not locked properly as a result of negligence. To unlock the locking device, a manual operation is still required to pull up the locking device, and therefore it is deemed inconvenient. Moreover, the locking devices of some cars have to be locked or unlocked with a key, and this is still deemed inconvenient to the user.

SUMMARY OF THE INVENTION

The prime object of the present invention is to provide a remote control type of automatic control device for the automobile door. It mainly comprises a receiving circuit to receive a respective signal from a remote control device. As soon as a signal is transmitted to the receiving circuit, the circuit will start to operate in accordance with the existing state of the locking device; for example, if a driver operates the remote control device after getting out of the car, the receiving circuit will cause the locking device to lock the door. If a driver operates the remote control device before getting into the car, the receiving circuit will cause the locking device to unlock the locking device which allows the driver to open the car door. The receiving circuit is also connected with an alarm circuit. When the car door is not opened with the remote control device, a warning sound will automatically be sent out by the alarm.

The secondary object of the present invention is to provide a remote control type of automatic control device for the automobile door, whereby the car doors can be locked automatically with the locking device when; the car is running, and when the car is stopped, the locking device can be unlocked automatically. It is apparent that the locking device can provide both safety and convenience features.

DETAILED DESCRIPTION

The present invention is particularly adaptable to the locking device of an automobile door. The conventional on the locking device is usually installed on the inside the car door. When the locking device is set in the locked position, the car door cannot be opened even if it is banged by a person. The car door can only be opened by unlocking the device. Since the locking device is not the main topic of the present invention, no further details of it will be given. The main object of the present invention is to improve the automatic control structure of an electric locking device. In order to facilitate the following description, the "locked condition" hereafter will be described as "down", while the "unlocked condition" will be described as "up" (in real operation, the locking condition is actually a lifting up motion). The high and low potential in this specification are indicated with "H" and "L" respectively.

Figure 3:
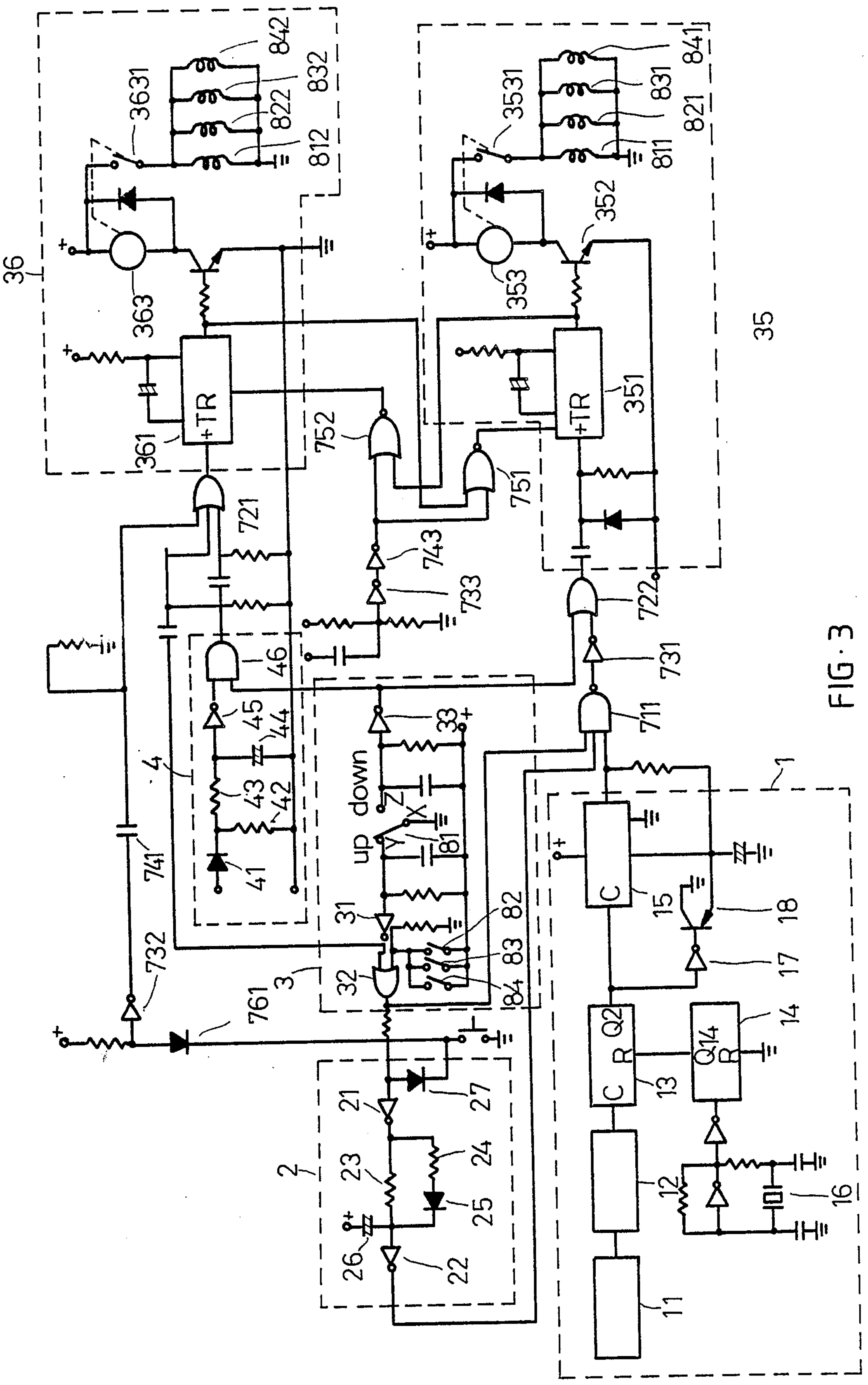
FIG. 3 illustrates the control circuit of the locking device according to the present invention.
Figure 5:
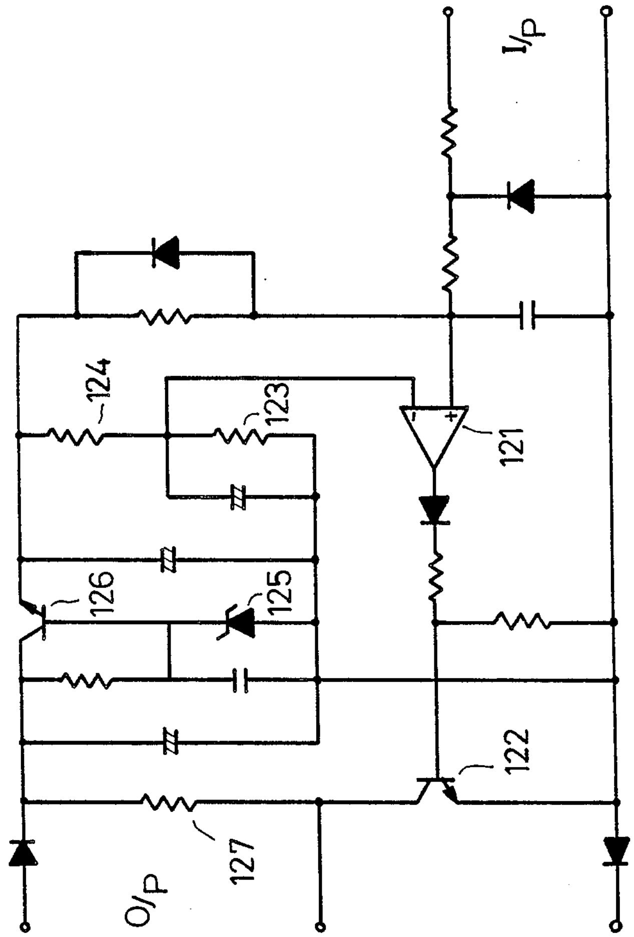
FIG. 5 illustrates a pre-amplifier circuit according to the present invention.

The main control circuit of the present invention, as shown in FIG. 3, consists of: a car-speed detecting circuit (1), which generates a "H" output when the car is moving; a switch circuit (3) which includes the locking devices for all the car doors and their accompanying microswitches; thereof, a delay locking circuit (2), which generates an "H" output after a short delay after receipt of an "H" signal from the switch circuit (3); an unlocking circuit (4), which can generate an "H" output; a locking circuit (35) an unlocking circuit (36); and a given number of logic gates. The preceding stage of the locking circuit (35) is AND gate (722) being connected in series with inverter (731) and NAND gate (711). The unlocking circuit (36) is controlled with OR gate (721). The structure and operation of the aforesaid circuits are described in detail in the following:

Within the car-speed detecting circuit (1), the speed sensor (11) is a permanent magnet which rotates synchronously with the car motor. When the magnet is rotating, it will cut a magnetic field generated by a coil. The speed sensor (11) may also be made from a photocell element, which may include: a rotary disk with a series of holes through it, two light sources (such as lamps) installed near both sides of the rotary disk, and photo-transistors. The rotary disk would rotate in direct proportion to the car speed, and the car speed would be detected. Although the car speed may be detected with different methods, the car speed sensor mentioned in the following parapragh will refer to a magnetic-field-cutting type of sensor. The pre-amplifier (12), as shown in FIG. 5, comprises an operational amplifier (121) and a transistor (122); the transistor (126) and the zener-diode (125) are used to stabilize the D.C. power. The D.C. voltage passes through resistors (123) and (124) to be divided properly before being applied to the negative input terminal of the operational amplifier (121) as a reference voltage. The output signal from the speed sensor (11) is applied to the positive input terminal of the operational amplifier (121). When the car is running, the voltage appearing on the positive input terminal of the amplifier (121) is higher than that on the negative input terminal; as a result, the amplifier (121) will have an output to drive transistor (122) into conductance. The resistor (127) connected to the collector of transistor (127) and will generate an output signal.

The car-speed detecting circuit (1) of the present invention employs a digital frequency counting method to generate a car-speed signal. In addition to the signals attained from the speed sensor (11) and the pre-amplifier (12), there is a time based signal which is generated with a quartz oscillator (16). This signal passes through a 14-stage divider (14) (which could be a 4020 type IC) to generate a signal of one Hertz per second (i.e., 0.5 second in "H" state, and 0.5 second in "L" state). This signal will then be transmitted to the reset of binary counter (13). The signal from pre-amplifier (12) is coupled to the clock terminal of binary counter (13). In the event that the clock terminal of counter (13) has more than eight pulses input to it within 0.5 seconds, the output terminal of the counter (13) will have a pulse output. When that pulse output at a frequency of one Hertz per second is coupled to the clock terminal of a mono-stable circuit (15), the output terminal of the monostable circuit (15) will have an "H" output; otherwise, the circuit (15) will have an "L" output. Briefly, the car-speed detecting circuit (1) has a time base signal as its reference signal. When the car is sensed to be moving, the car-speed detecting circuit (1) will have an "H" output. When the car is stopped, the output of the circuit (1) will be in the "L" state.

In FIG. 3, the switch circuit (3) is mainly used to sense whether the locking device is set in the "down" or "up" state. From the four micro-switches (81), (82), (83) and (84), micro-switch (81), from the main door, is used as the sensing element of the locking device. When switch (81) is set in the X-Y position the locking device is set in the "up" state; when the switch (81) is set in the X-Z position the locking device is set in the "down" state. The other micro-switches (82) to (84) are installed on the other car doors respectively. When the micro-switches (82), (83) and (84) are closed, the locking devices of the car doors are set in "up" state. When the micro-switches (82), (83), and (84) are open, the locking devices of the doors are set in the "down" state. The contact Z (locking contact) of the micro-switch (81) is connected to inverter (33), while the contact Y (unlocking contact) of the micro-switch (81) is connected to inverter (31), which is connected to an input terminal of OR gate (32); the other input terminal of OR gate (32) is connected to the micro-switches (82), (83), and (84). In the case of one of the micro-switches (81) to (84) being in the "UP" state, the OR gate (32) will have the "H" output. When the micro-switch (81) is in the "down" state, the inverter (33) will have the "H" output.

The function of the delayed locking circuit (2) is to delay the automatic lock time so as to prevent having a counter force between a manual pulling force and a mechanical force on the door's locking device. Since the present invention is to be mounted at an automobile, the locking devices on the car doors not only can be automatically controlled with coils (to be described later) for the "up" or "down" state, but can also be controlled manually. This feature of manual control presents a problem. If one was to set a lock in the "up" state while the car is being driven, a "down" state could be set immediately by a mechanical force. In order to avoid possible mechanical problems with the locking device, a very short time delay has been instituted within the circuitry of this invention. A delay of one to five seconds is incurred between the time of receipt of the request to set the locks "down" and the actual time when this is done. This feature not only can be used as a warning and a means for an automatic locking, but also can prevent problems resulting from a counter force. The input and output of the delayed locking circuit (2) are connected to inverters (21) and (22) respectively. The output terminal of inverter (21) and the input terminal of inverter (22) are connected with two circuits connected in parallel. One merely includes a resistor (23), while the other includes a resistor (24) and a diode (25) in series. The cathode of diode (25) is connected to the input terminal of inverter (22); both of these are connected with the positive terminal of a power supply through a capacitor (26). The values of resistor (23) is much greater than that of resistor (24) (in the real circuit, $R_{23}$ has a value of 68K ohms, while R24 has a value of 5.6K ohms). In the delayed locking circuit (2), the input terminal of inverter (21) is connected to the output terminal of OR gate (32) of the switch circuit (3), and is also connected in the forward direction with diode (27). Diode (27) has its other end connected with an unlocking control switch (8); the other end of the switch (8) is grounded. When the switch circuit has an "H" output, the inverter (21) will have an "L" output; simultaneously, the positive terminal of the power supply will charge the capacitor (26) via R23. Since R23 has a large value, the inverter (22) will have the "H" output after a given time delay. In the event inverter 21 has an "L" input (the "L" input might be caused by switch circuit (3) generating the "L" output, or the unlocking control switch (8) to generate an "L" signal upon being pressed), the inverter (21) will have the "H" output, which will pass through R24 and diode (25) to cause inverter (22) to generate the "L" output.

The locking circuit (35), by means of the car-speed detecting circuit (1), the delayed lökcing circuit (2), and the switch circuit (3) can automatically have the various car door locking devices set from the "up" state to the "down" state. The locking circuit (35) mainly comprises a positively triggered mono-stable circuit (351), a transistor (352) and a relay (353). The output terminal of the positively triggered mono-stable circuit (351) is connected to the base of transistor (352); the collector of transistor (352) is connected to the relay (353). The normally open switch (3531) of relay (353) is connected to four locking coils (811), (821), (831) and (841) being connected in parallel. When the locking coils (811), (821), (831) and (841) are energized, the locking devices of the corresponding car doors will be set from the "up" position to the "down" position, i.e. the various micro-switches (81), (82), (83) and (84) will be set in the "down" position. The locking circuit (35), the car-speed detecting circuit (1), the delayed locking circuit (2) and the switch circuit (3) are inter-connected by means of AND gate (722), which includes a NAND gate (711) and an inverter (731) as shown in FIG. 3. The four circuits may also be connected by the two NAND gates (711) and (712) as shown in FIG. 3; in this case, the three input terminals of NAND gate (712) should be connected together. In FIG. 3, the three input terminals of NAND gate (711) are connected to the output terminals of the monostable circuit (15), the inverter (22) and the OR gate (32). The output terminal of inverter (731) is connected, via OR gate (722), to the triggering terminal of a positively triggered monostable circuit (351). The other input terminal of OR gate (722) is connected with the output of inverter (33) of the switch circuit (3). According to the locking procedures of the present invention, if one of the locking devices of a car door is in the "up" position when the car is running, the three input terminals of NAND gate (711) will, after a very short time delay, be in an "H" state which causes the positively triggered monostable circuit to be triggered. The output of the monostable circuit will drive the transistor (352) into conductance. The relay (353) is energized to cause the normally open switch (3531) to close; as a result, all locking coils (811), (821), (831) and (841) will be energized and all the locking switches of all the doors of car to will be set in the "down" state instead of "up" state, i.e., a running car can automatically be locked up to maintain a high safety standard.

In addition to the safety feature mentioned above, the present invention can also provide convenience, for instance: the locking devices can automatically lock ("down" state) when the car is running, but the locking devices may also be set in the "up" state by manually pressing the unlocking control switch. Further, when the car is stopped, the locking devices can also be set in the "up" state automatically. The unlocking circuit (36) shown in FIG. 3 is used for the unlocking function. It is similar to the locking circuit (35) in that includes positively triggered mono-stable circuit (361), a transistor (362), and a relay (363). The only difference between the two is that circuit (36) includes unlocking coils (812), (822), (832) and (842) connected in parallel. When these coils are energized, all the locking devices will be set in the "up" state instead of the "down" state. The unlocking circuit (36) is mainly controlled with an OR gate (721). The output of the OR gate (721) is connected with the triggering terminal of a positively triggered mono-stable circuit (361). The unlocking control switch (8) is connected to diode (761), which is then connected via a resistor to a power supply. The anode of diode (761) is connected with the input terminal of inverter (732), which has its output terminal connected through capacitor (741), to the input terminal of the OR gate (721). To release the locking state, a push on the unlocking control switch (8) enables the inverter (732) to generate an "H" output. This "H" signal will pass through capacitor (741) and will cause OR gate (721) to generate output. This "H" output from OR gate (721) enables the positively triggered mono-stable circuit to generate an output signal. This output signal drives transistor (362) into conductance which in turn energizes relay (363). As a result, the normally open swtich (3631) will be closed, thus energizing the locking coils (811), (821), (831) and (841) which set all locking devices in the "up" state.

In order to have the locking devices unlock automatically after the car motor has been stopped, an unlocking triggering circuit (4) is provided and is shown in FIG. 3; the input terminal of the circuit is connected with the power supply of the car. When the power supply switch of the car is turned on, the input terminal of the circuit will have a 12 volt power supply across it. When the power supply switch is turned off, the input terminal will have a the "L" state. The parts of the unlocking triggering circuit (4) are arranged similar to a "$\pi$" shape. The parts of the circuit include a diode (41), a resistor (43) and an inverter (45) all connected in series. Connected between the aforesaid parts are resistor (42) and capacitor (44). The output terminal of the inverter (45) is connected to the input terminal of AND gate (46), The AND gate (46) has its other input terminal connected to the output terminal of inverter (33) of the switch circuit 3. After the car has been started, the input terminal of diode (41) will have 12 volts connected to it. A current generated by this voltage will pass through resistor (43) will charge capacitor (44). As soon as the capacitor is charged to the "H" level, the output of inverter (45) will be a the "L" level. In the event of the car motor being stopped, the power supply will be cut off and the voltage across the capacitor (44) will be discharged, via resistors (43) and (42), to the "L" level. In this case, the inverter (45) will have the "H" output. Therefore, as long as the input terminal of AND gate (46), connected with the switch circuit 3, is in the "H" state (i.e., some of the locking devices being set in the "down" position) the AND gate (46) will have the "H" output. This "H" output will pass through the OR gate (721) and will operate the unlocking circuit 36 which will automatically release the locking devices.

According to the aforesaid description, it is apparennt that the locking devices may be set in the "down" or "up" position automatically when the car is first started or when the motor is shut off; the locking devices have the features of safety and convenience. In the aforesaid circuit, the locking circuit (35) is controlled by either an AND gate, constructed from NAND gate (711) and inverter (731), or by the two NAND gates (711) and (712). When the three input terminals of NAND gate (711) are in the "H" state, a "H" state will appear at the input of OR gate (722), thus causing locking circuit (35) to operate, i.e., the locking devices will be locked automatically when the car first starts moving. The other input terminal of OR gate (722) is connected to the output terminal of inverter (33) which is part of switch circuit 3. The driver may press the locking device on the door beside driver's seat downwards, if necessary, to have the X-Z contacts of micro-switch (81) connect together. This means the inverter (33) will have the "H" output which will pass to OR gate (722) producing an "H" signal on the OR gate's output. Moreover, in addition to having the locking device unlock when the car motor is stopped, because of the unlocking triggering circuit (4) having the "H" output, or unlocking the locking device by pressing the unlocking control switch (8), forcing OR gate (721) to have the "H" output, the driver may also unlock the locking device by pulling up the locking device on the door beside the driver's seat. Since the output terminal of the inverter (31) in switch circuit (3) is connected to the input terminal of OR gate (721), the contacts X-Y of micro-switch (81) will, when the locking device on the door beside driver's seat is pulled up, be connected this causes inverter (31) to have the "H" output, thereby unlocking the locking device.

Figure 4:
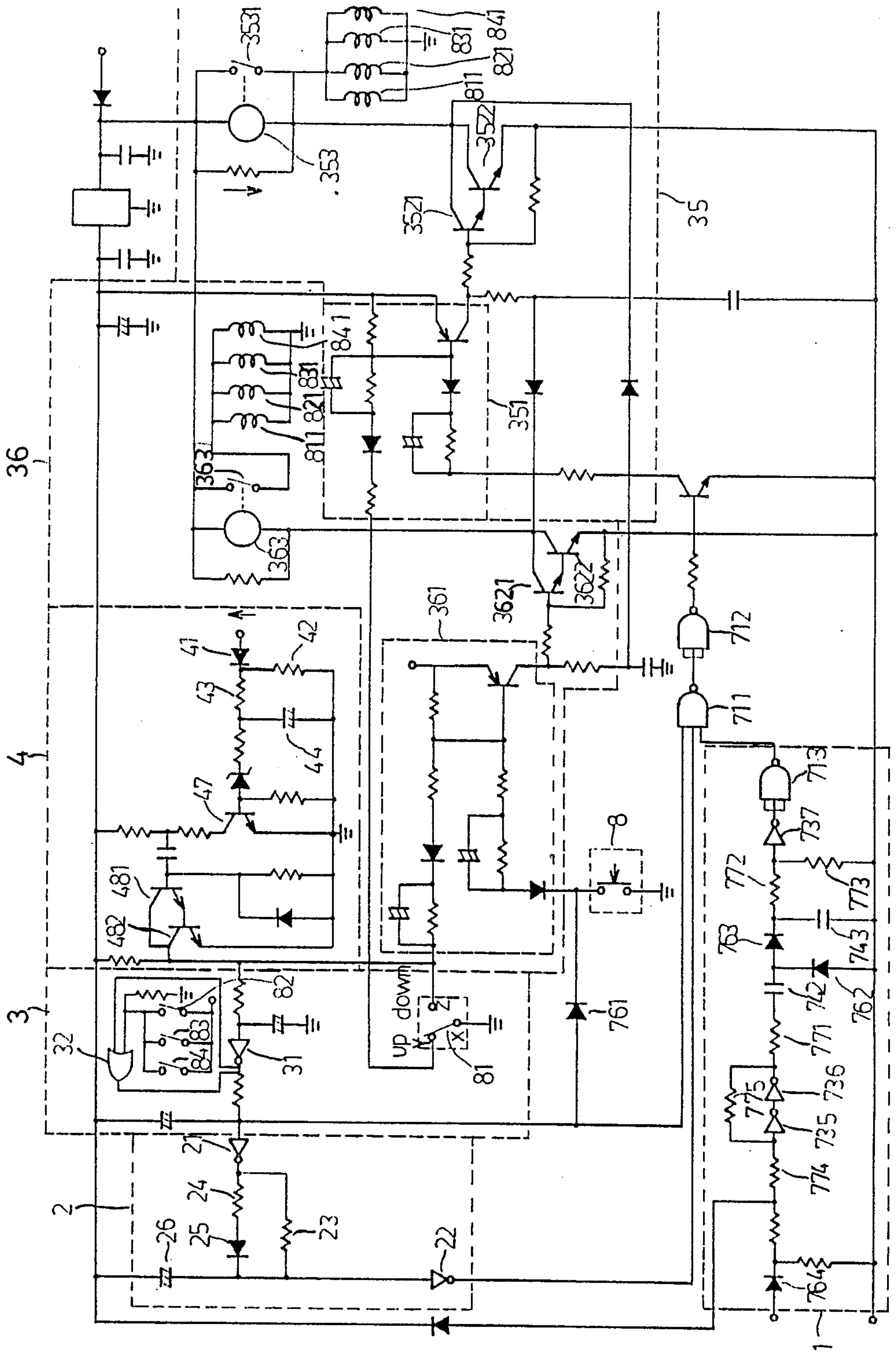
FIG. 4 illustrates another control circuit for the locking device according to the present invention.

The circuit shown in FIG. 3 is largely made of logic elements. In fact, the function of the circuit shown in FIG. 3 may also be achieved by means of conventional electronic elements as shown in FIG. 4. For instance, the positively triggered mono-stable circuits (351) and (361) of FIG. 3 may be replaced with transistors, as shown in FIG. 4. The transistors (352) and (362) connected with relays (353) and (363) may be replaced by Darlington circuits made up of transistors (3521), (3522), (3621) and (3622). As well the unlocking triggering circuit (4) may be replaced with the conventional electronic elements. The inverter (45) may be replaced with transistor (47). The Darlington amplifier formed by transistors (481) and (482) can provide the function of the AND gate (721). When the power supply switch of the car is turned on, the power will pass through diode (41), transistor 43 cause capacitor (44) to charge. When the voltage across the capacitor reaches four volts or so, the transistor (47) will start to conduct, as a result, the capacitor connected to the collector of transistor (47) will have a low voltage, thus causing the transistors (481) and (482) not to operate. In the event of the car power switch being turned off, capacitor (44)

will discharge thereby forcing transistor (47) into cut-off, and the voltage on the collector of transistor (47) will increase enabling the transistors (481) and (482) to generate an output signal.

The car-speed detecting circuit (1) in FIG. 3 is actually a frequency counting circuit, and may be replaced with a frequency/voltage converting circuit as shown in FIG. 4. The output signal from the speed sensor (11) passes through diode (764) in order to make a polarity correction. The signal then passes through two resistors and two series connected Schmitt inverters, (735) and (736). The two inverters are connected in parallel with resistor (775). The ratio of the two resistors (775) and (774) can increase the state-converting ratio of the two inverters (735) and (736). The output terminal of the two inverters (735) and (736) is connected in series with resistor (771) and capacitor (742). The output of capacitor (742) is connected to the cathode of diode (762) and to the anode of diode (763) in forward direction. The diode (763) is also connected to capacitor (743) and two resistors, (772) and (773), thereby forming a charge-discharge circuit. Schmitt inverter (737) and NAND gate (713) are connected in series and form an inverter. The Schmitt inverter (737) is used so that when an input is around the median between a "H" and "L" state, an "H" or "L" state may be estimated to have a definite output. According to FIG. 4, when a signal from the speed sensor (11) changes from an "L" to "H" state the capacitor (742) charges. The charge capacitor (742) will pass through diode (763) and will charge capacitor (743). When an input is changing from "H" to "L" state, the capacitor (742) will discharge via resistor (771) and diode (762); as a result, the capacitor (743) will discharge via resistors (773) and (772). Therefore, in the case of the signal from the speed sensor (11) having a higher frequency, it indicates that the car speed is over the reference speed, (generally, the car speed standard is set at 10 km). This input signal from the speed sensor will cause the capacitor (743) to require a longer charging time. Once a "H" signal input charge capacitor (743), the output of inverter (737) will be "L" and the signal transmitted to NAND gate (711) will be "H", i.e., this circuit of FIG. 4 can provide the same function as that of the car speed detecting circuit (1) shown in FIG. 1.

After understanding the structure of the locking devices of car doors, the user can see that as soon as the circuits shown in FIGS. 3 to 5 are installed in car doors, the doors could be locked automatically when the car is running so as to prevent an accident which could arise by forgetting to lock the doors. The locking device may be released by manually using the unlocking control switch (8), or by using the locking device on the door beside driver's seat. Moreover, under normal conditions, the locking device can automatically be released when the car engine stops.

Figure 1:
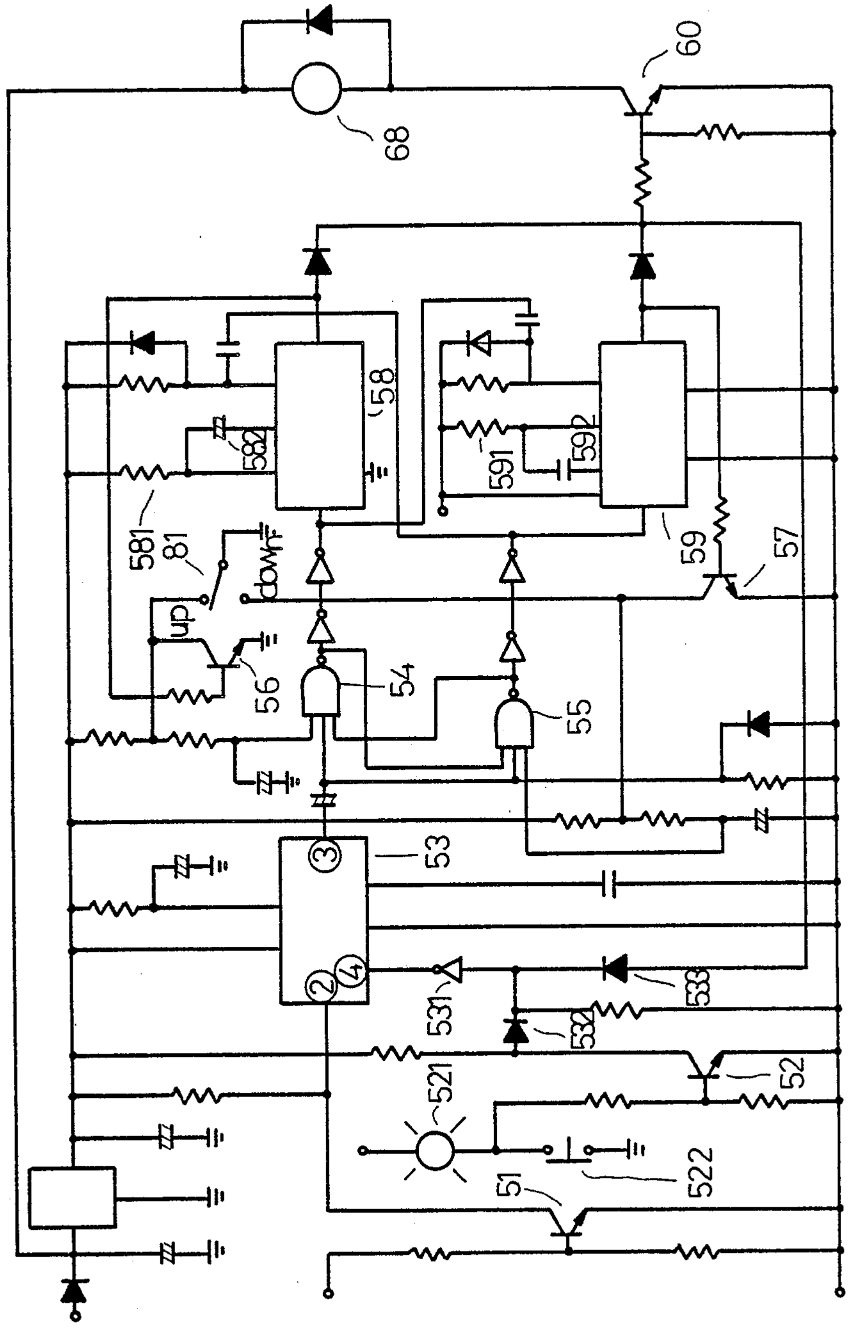
FIG. 1 illustrates a reception circuit according to the present invention.

Referring to FIG. 1, a receiving circuit is comprised of trigger (53), two NAND gates (54) and (55), and the two negatively triggered mono-stable circuits (58) and (59). The trigger (53), possibly of IC type NE555, has its input terminal connected to the collector of transistor (51) in the receiving circuit. The output terminal (3) of trigger (53) is connected to the input terminals of two NAND gates (54) and (55). Each of the two NAND gates (54) and (55) have three input terminals: the first input terminal is connected to the output terminal (3) of trigger (53); the second input terminal is connected to the output terminal of its corresponding NAND gate (55) or (54), so as to make sure that only one of two NAND gates (55) or (54) has an "L" output; the third output terminal is connected to the micro-switch (81) of the locking device on the main door of car, as shown in FIG. 3. In fact, the input terminal of NAND gate (54) is connected to the "up" contact Y of micro-switch 81, while the input terminal of NAND gate (55) is connected to the "down" contact X of micro-switch (81). If the locking device is set in the "up" position, the NAND gate (54) will have a permanent "H" output, and NAND gate (55) will not be triggered to operate normally.

The output terminals of NAND gates (54) and (55), in the receiving circuit, are connected with the triggering terminals of the corresponding negatively triggered monostable circuits (58) and (59), (in fact, the output terminals of the NAND gates (54) and (55) are connected to two inverters connected in series, in order to have the same output results). The operation time of the two mono-stable circuits (58) and (59) is determined by the capacitors (582) and (592), and resistors (581) and (591). In order to make the output of the two mono-stable circuits (59) and (58) being different from one another, the value of resistor (581) is several times higher than that of resistor (591) (of course, their values might be exchanged). The output terminals of the two mono-stable circuits (58) and (59) are all connected to the collector of output transistor (60). The collector of transistor (60) is in series with relay (68) and a power supply. The relay (68) is connected to an indicating lamp (not shown in FIG. 1).

When a user sends a signal with the remote control device towards the receiving device of the car, the signal will cause the transistor (51) to conduct and will in turn drive the trigger (53), which will generate an output signal. If the locking device is set in the "down" position (i.e., the car doors being already locked up), the ouput signal of the trigger (53) will cause the NAND gate (54) to have an "L" output, which will cause the mono-stable circuit (58) to trigger transistor (60) into a conductive state, and the indicating lamp will blink three times (i.e., the unlocking operation). If the car door locking device is set in the "up" position (i.e., the door being unlocked ), the output signal of trigger (53) will enable NAND gate (55) to operate and will cause the mono-stable circuit (59) to trigger transistor (60) into conductance, whereby the indicating lamp will blink once (to lock the car doors).

FIG. 1 shows the reset terminal of trigger (53) connected to inverter (531). The base of transistor (52) is connected through lamp (521) to the positive terminal of a power supply. The base is also grounded through switch (522), which is installed on the door edge of the car. When the car door is opened, switch (522) will be closed, and the lamp (521) will light. When the car door is totally closed, switch (522) will be open; otherwise, the switch will be turned on. When lamp (521) is lit transistor (52) will be cut-off; therefore, the collector of transistor (52) will be in an "H" state. This "H" state will pass through diode (532) and will trigger inverter (531). The inverter (531) will have an "L" output which is applied to the reset terminal of trigger (53). With an "L" input the trigger (53) will not operate. When the car door is not closed, the car door cannot be locked, even by using the remote control device. This feature is particularly useful when determining whether the car door is totally closed or just partially when a driver has parked the car, and wants to leave.

Figure 2:
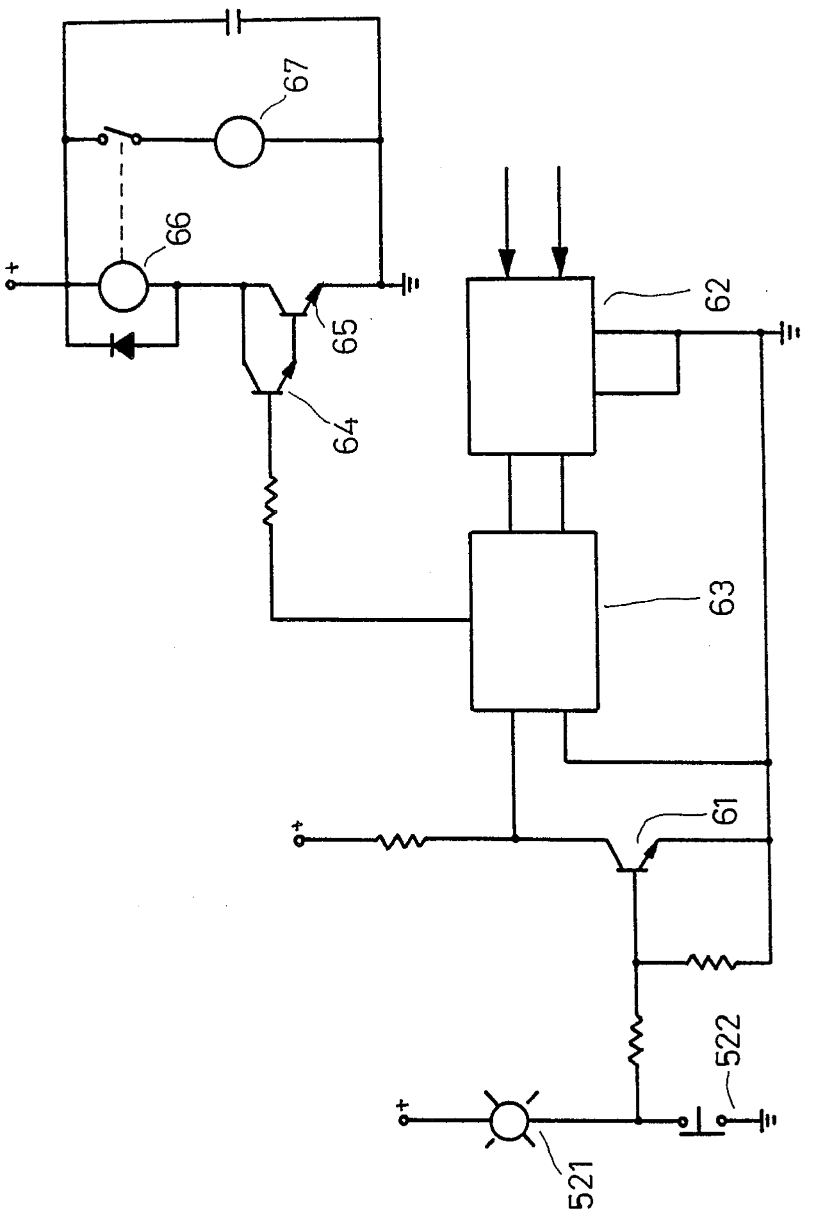
FIG. 2 illustrates an alarm circuit according to the present invention.

FIG. 2 shows an alarm circuit, in which alarm (67) is connected to a switch controlled by relay 66. This relay is connected in series with the collector of transistor (65) of a Darlington circuit. There are two D-type flip-flop circuits, (62) and (63), in which the forward output terminal (Q) of the front stage flip-flop circuit (62) is connected to the input terminal (D) of the rear stage flip-flop circuit (63). The reverse output terminal ($\overline{Q}$) of the front stage flip-flop circuit (62) is connected to the reset terminal (R) of the rear stage flip-flop 63. The forward output terminal (Q) of the rear stage flip-flop (63) is connected to the base of the front stage transistor (64) of the Darlington amplifier. The clock terminal (C) of the flip-flop circuit (63) is connected with the base of transistor 61. The base of transistor (61) is also connected, through lamp (521) to the positive terminal of a power supply, and through switch (522) to ground (these two parts are the same as those shown in FIG. 1). The reset terminal (R) and the set terminal (S) of the flip-flop circuit (62) are connected with the output terminals of the mono-stable circuits (58) and (59) as shown in FIG. 1. According to FIG. 2, when the car doors are completely switch (522) is open, therefore the positive power supply will cause transistor (61) to conduct. With transistor (61) conducting the clock terminal (C) of the rear stage flip-flop circuit (63) will be in an "L" state, and the terminal (Q) will have no output. When the car door is opened, switch (522) will be closed, and transistor 61 will be cut-off, as well, the clock terminal of the flip-flop circuit (63) will be an "H" state. In this case, two conditions can occur. Under the first condition the car door is opened because the receiving circuit received a signal from the remote control device, operated by the user, to unlock the locking device. When releasing the locking device, the output signal of the mono-stable circuit (58) of FIG. 1 will be transmitted to the reset terminal (R) of flip-flop (58) forcing the output terminal (Q) into an "L" state. The therefor, the input terminal (D) of the rear stage flip-flop circuit (63) will also be in an "L" state. Even if the clock terminal [C] is changed from an "L" to an "H" state, a result of the car door being opened, the output terminal [Q] and the input terminal [D] will both be in a "L" state, and the alarm [67] will not operate (the normal way to open the car door) under the second condition, when the reset terminal (R) has no input signal, and the receiving circuit has not received any signal, the output terminal [Q] of flip-flop (62) will have already triggered the set terminal (S) into an "H" state because the locking device having been locked (the driver has left the car). Under these conditions the output terminal [Q] will also be in "H" state. Simultaneously, the input terminal [D] of the rear stage will be in an "H" state. So whenever the car door is opened (not opened by using remote control device but opened by a burglar), the clock terminal [C] of the rear stage flip-flop circuit [63] will be in an "H" state, and the output terminal (Q) will be in an "H" state in accordance with the state its input terminal. Therefore, the Darlington circuit will be triggered to operate and will energize relay [66] and the alarm [67] will generate a sound signal.

I claim:

1. An automatic remote control locking and unlocking devices for automobile doors and the like, comprising in combination:

a plurality of interconnected circuits including (I) a receiving circuit;

(II) a control circuit;

(III) a switch circuit;

(IV) a delayed locking circuit connected to said switch circuit;

(V) a car-speed detecting circuit;

(VI) a first locking circuit;

(VII) a second locking circuit;

(VIII) a first unlocking circuit; and (IX) a second unlocking circuit;

said receiving circuit at least including:

(a) a trigger having input and output terminals;

(b) two NAND gates, each having at least first and second input terminals;

(c) two negative triggering mono-stable circuits;

(d) an input transistor;

(e) an output transistor;

(f) a micro-switch, having unlocking and locking contacts and a center contact, operatively connected to a respective main car door, with the center contact of said micro-switch being grounded;

wherein an input terminal of said trigger is connected to said input transistor, and upon receipt of a respective signal an output terminal of said trigger is emitting a signal;

the first input terminal of each of said two NAND gates is respectively connected to the output terminal of said trigger;

the second input terminal of each of said two NAND gates is respectively connected to the unlocking and locking contacts of said micro-switch;

the output terminals of said NAND gates are respectively connected with said locking contacts of said microswitch;

said locking contact of said micro-switch being connected respectively with the input terminals of said negative triggering mono-stable circuits for respectively effecting unlocking or locking; and the output terminals of said negative triggering mono-stable circuits being connected to the base of said output transistor;

(g) a relay connected with the collector of said output transistor; and (h) an indicating lamp operable by way of said relay;

said control circuit including said first recited micro-switch and associated micro-switches for the locking devices of car doors, and said control circuit further including said switch circuit;

(i) an AND gate connected to the output terminals of said first locking circuit, said switch circuit and said car-speed detecting circuit, and the output of said AND gate controlling said second locking circuit;

(j) locking coils in respective of said locking and unlocking circuits, for the car-door locking device, with said locking coils being connected in parallel at the output terminal of said delayed locking circuit, and with said locking devices on the car doors being locked up automatically upon at least three circuits having an "H" output terminal of the second unlocking circuit connected with respective unlocking coils of the locking devices of the car doors;

(k) at least one OR gate for controlling of the respective unlocking circuit being controlled by said OR gate;

(l) an unlocking control switch of which one terminal is grounded, with the other terminal being connected through a first inverter with the input terminal of said OR gate; and (m) the first inverter as aforesaid, connected to said second unlocking circuit and with another input terminal of said OR gate, with either pressing of said unlocking control switch and the car being stopped, said unlocking control switch starting to operate, and said OR gate generating an output signal to drive said respective unlocking circuit to substantially automatically release the car's locking devices.

2. The device according to claim 1, wherein the output terminals of the respectively negative triggering mono-stable circuits in said receiving circuit are respectively connected with the reset and setting terminals of a front stage D-type flip-flop circuit in an alarm circuit including at least an amplifier and an alarm, wherein the positive and negative terminals of said front stage D-type flip-flop circuit are connected with the input and reset terminals of a rear stage D-type flip-flop circuit respectively, and the output terminal of said rear stage D-type flip-flop circuit is adapted to drive said amplifier, with the respective clock terminal of said rear stage D-type flip-flop circuit being connected with the collector of a respective car door transistor, of which the base is connected, through said car door, to ground in such a way that when the car door is being opened without utilization of said receiving circuit, said front stage flip-flop circuit transmits a high potential signal to the input terminal of said rear stage flip-flop circuit and with the respective car door transistor being in its cutoff state, said clock terminal of said rear stage D-type flip-flop circuit is changed from low potential to high potential, with the output terminal being subjected to a high potential according to the input terminal thereof so as to drive said alarm for emitting a burglar warning signal.

3. The device according to claim 1, wherein a reset terminal of said trigger in said receiving circuit is controlled with a further transistor and said first inverter is connected between the output terminal of said further transistor and said reset terminal, and wherein the base of said reset terminal is connected, through a car door switch to ground, such that when the car door is opened, said car door switch is brought to its closed state to cause said further transistor to become inactive and the reset terminal of said trigger being in its low potential state to cause deactivation of said trigger.

4. The device according to claim 1, wherein one input terminal of said two NAND gates of said receiving circuit is connected with the output terminal of its associated said NAND gates to allow operation of only one of said NAND gates.

5. The device according to claim 1, wherein a resistor connected with one of the negative triggering monostable circuits in said receiving circuit and the resistor connected with one of the negative triggering monostable circuit in said receiving circuit are different in value so as to generate different output signals.

6. The device according to claim 1, wherein one of the negative circuits in said control circuit has said AND gate to provide an output, with the input terminal of said AND gate being connected with said switch circuit, and between the input terminal of said second unlocking circuit and the other input terminal of said AND gate, there are a diode, a first resistor, and a second inverter, all connected in series sequence; and between said diode and said first resistor, between said first resistor and said second invertor, a second resistor and capacitor are connected respectively in parallel between the input terminals of said second unlocking circuit; and when said circuit is having a positive voltage, said voltage will pass through said diode and said first resistor to charge said capacitor and to cause said second inverter to have a low potential output, but in the event of having no input, said capacitor will discharge via said first resistors connected therewith so as to cause said second inverter to have a high potential output, and as long as the car door is in its locking state, said AND gate will have a high potential output to drive said unlocking circuit to operate and to have every locking coil energized to provide the function of automatically releasing the locking device.

7. The device according to claim 1, wherein the car-speed detecting circuit of said control circuit includes a speed sensor; and after a car speed is being sensed by said speed sensor, a signal from said sensor is passing a pre-amplifier for comparison and amplification, and then said signal is transmitted to the clock terminal of a counter, with the reset terminal of said counter being connected with a quartz oscillator and a divider for generating a time base signal; and the output terminal of said counter being connected with one of said respective negative triggering mono-stable circuits so as to sense the car speed by way of frequency counting technique.

8. The device according to claim 1, wherein said car-speed detecting circuit in said control circuit performs the function of a frequency/voltage converter for processing an input signal, said signal passing through a series of resistors and capacitors, and said capacitors being connected reversely with a diode to a charge-and-discharge circuit including a capacitor and resistors; and after said signal passing through a Schmitt inverter with a high frequency output, said capacitor in said charge-and-discharge circuit being charged such that said Schmitt inverter will have a high potential, and the purpose of detecting the car speed being accomplished.

9. The device according to claim 1, wherein by means of a respective circuit a remote control unit is being used to control said respective locking device directly; and after said receiving circuit receiving a signal, said locking device being unlocked or locked in accordance with the condition of said locking device in that moment with said locking device being locked or released automatically in accordance with the car condition of being driven or parking.

10. The device according to claim 1, wherein said second unlocking circuit is substantially the same as said second locking circuit.

* * * * *